Sept. 19, 1939.    J. D. McKELLAR    2,173,538
AIRPLANE CONTROL SYSTEM
Filed Sept. 4, 1937    3 Sheets-Sheet 1

INVENTOR.
John Donald McKellar

Sept. 19, 1939.                J. D. McKELLAR                2,173,538
                          AIRPLANE CONTROL SYSTEM
                          Filed Sept. 4, 1937          3 Sheets-Sheet 2
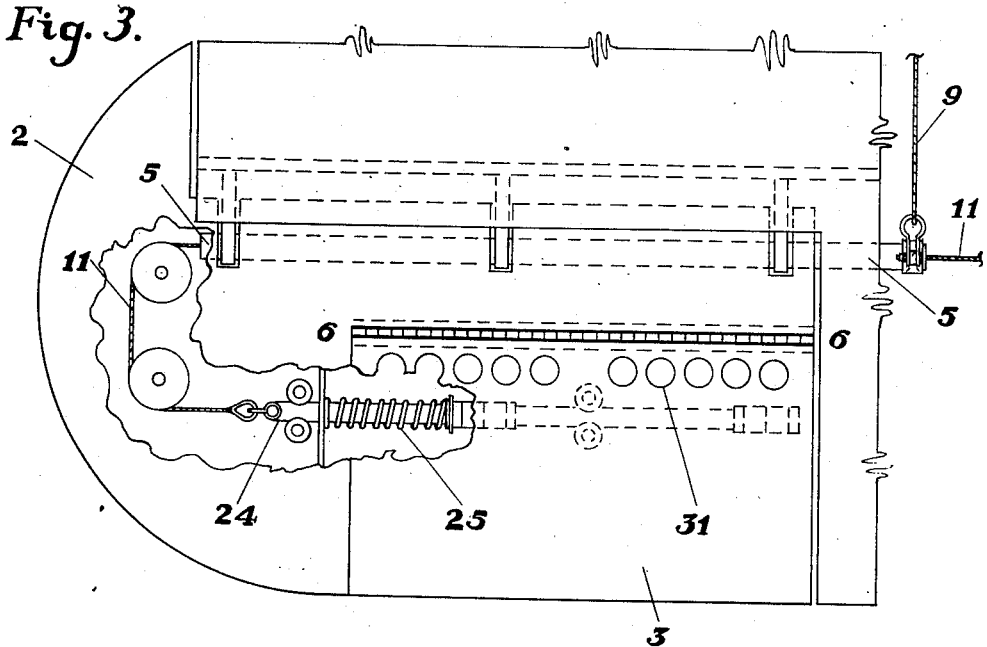
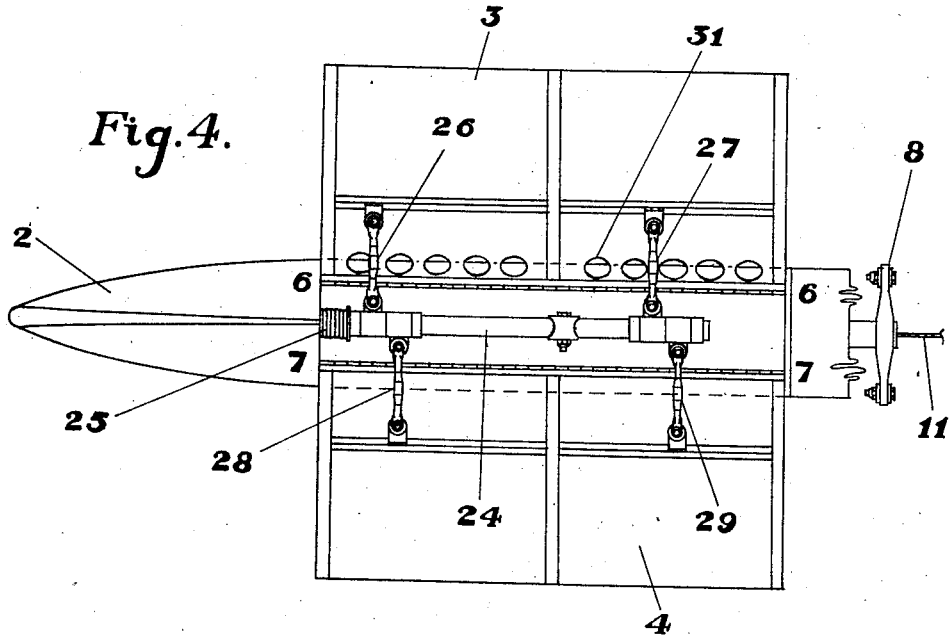
INVENTOR.
John Donald McKellar

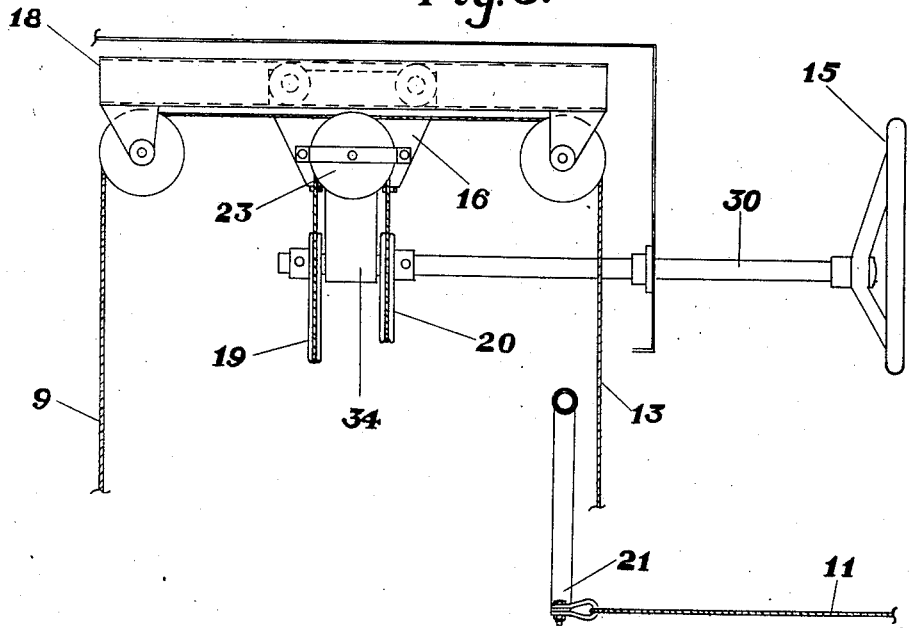
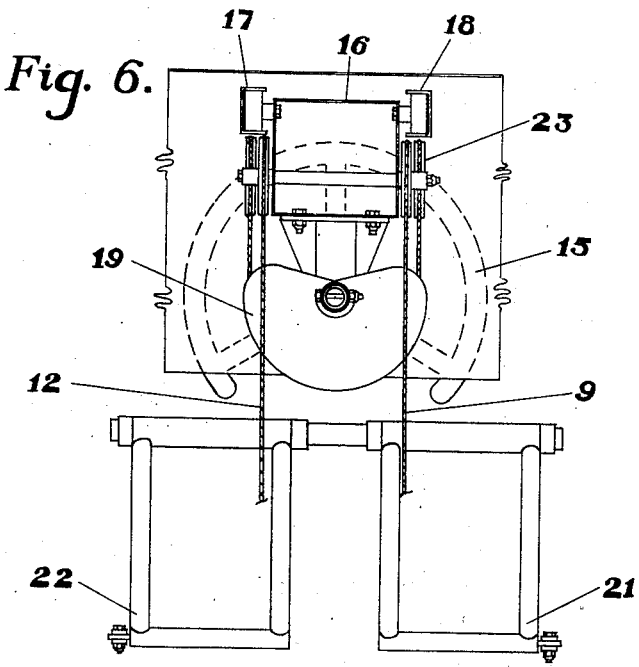

Patented Sept. 19, 1939

2,173,538

UNITED STATES PATENT OFFICE 2,173,538

AIRPLANE CONTROL SYSTEM

John Donald McKellar, Burbank, Calif.

Application September 4, 1937, Serial No. 162,494

9 Claims. (Cl. 244—75)

REISSUED

My invention relates to improvements in the control system of an airplane with particular application to tailless airplanes. The object of my invention is to provide longitudinal, directional, and lateral control of an airplane, without the use of a tail or vertical control surfaces.

Longitudinal control is accomplished by deflecting surfaces at the trailing edge of the wings upward or downward.

Lateral control is accomplished by a differential movement of said surfaces so that on one side of the airplane the surface moves upward, while on the opposite side the other surface moves downward.

Directional control is accomplished by separating the upper and lower surfaces of the control device on the side toward which the turn is to be made in order to increase the aerodynamic drag on that side of the airplane and thus produce a yawing moment.

The device is unique in that a single control unit is provided on each semi-span of the airplane wing which will produce the required pitching, rolling, and yawing moments independently and/or simultaneously.

The device is also unique in that the sinking speed of the airplane may be increased by spreading both directional controls at the same time and thus increasing the drag of the airplane without producing a yawing moment. This feature will allow the glide path of the airplane to be varied without changing the setting of the flap or high lift device.

In addition, this deflection of the upper and lower surfaces of both control units can be utilized to act as a flap or high lift device on the lower surface of the control units and also as a boundary layer control device on the upper surface of the control units and thus increase the lift available, and delay the stall of the wing ahead of said control units.

One method of obtaining these objects is illustrated in the accompanying drawings. For simplicity, I have used cable operation, although push-pull tubes, or torque tubes, could be used to operate the device. The system is symmetrical and a unit such as would be used on the left wing is described in detail. Similar numerals refer to similar parts throughout the several views.

Figure 1 is a plan view of an airplane using my control system. The left control unit 2 is hinged about an axis 5 5. The upper control surface is hinged about an axis 6 6.

Figure 3 is a plan view of the left control unit.

Figure 4 is a rear view of the left control unit.

Figure 5 is a side view of a cockpit arrangement consisting of a control wheel assembly and foot pedals for operating the control units.

Figure 6 is a front view of the cockpit arrangement required to operate the control units.

Figure 1:
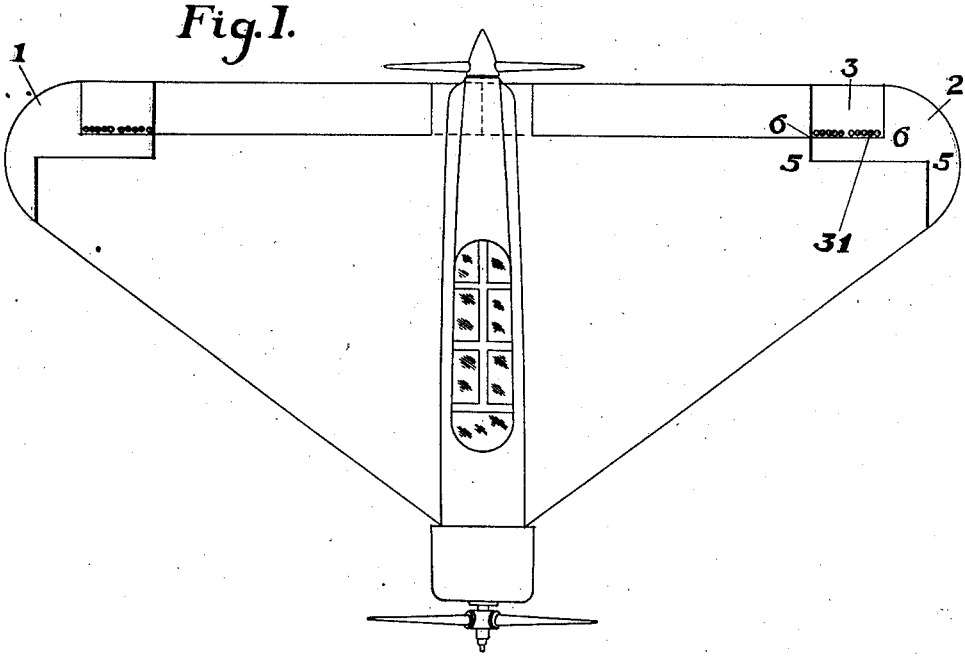
Figure 2:
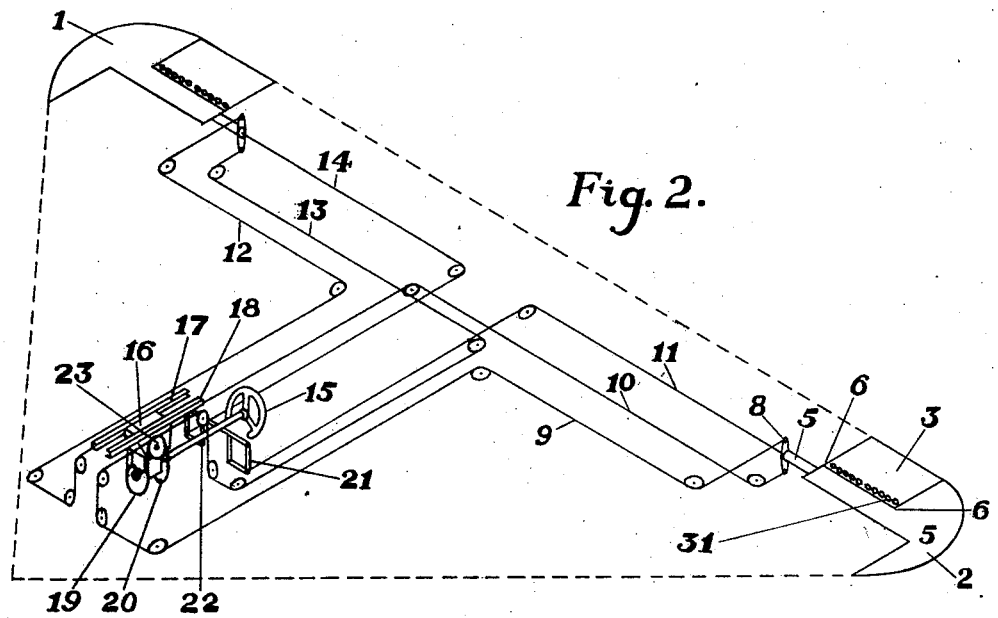
Figure 2 is an isometric, schematic drawing showing the cable control arrangement required to operate the control units.

The manner in which a pilot would operate my control system is as follows:

To raise the nose of the airplane the pilot would pull backward on the control wheel 15; the shaft 30 would pull the carriage 16 to the rear; this would pull on cables 9 and 12 and loosen cables 10 and 13, thus deflecting the trailing edge of the control units 1 and 2 upward creating a positive pitching moment about the center of gravity of the airplane. Conversely, a forward movement of the control wheel would deflect the control units 1 and 2 downward and produce a diving moment on the airplane.

To lower the left wing the pilot would turn control wheel 15 counterclockwise; shaft 30 would rotate quadrants 19 and 20 counterclockwise pulling on cables 9 and 13 and loosening cables 10 and 12; this would deflect the left control unit 2 upward and the right control unit 1 downward, thus producing an unsymmetrical span-wise lift distribution which would roll the airplane.

For use on some airplanes it would be desirable to make the quadrants 19 and 20 dissimilar in operating radius and the upper and lower arms of operating lever 8 of different length in order that the up movement of the control units would be greater than the down movement. This would avoid adverse yawing moments due to the unsymmetrical lift distribution.

Conversely, turning the control wheel 15 clockwise would roll the airplane clockwise.

To yaw the airplane to the left, the pilot would depress the left foot pedal 21, pulling on cable 11 which passes freely through the hinge tube 5 5 moving member 24 to the left, increasing the angle of arms 26, 27, 28, and 29, thus raising the upper control surface 3 and lowering the lower control surface 4.

Spreading the surfaces 3 and 4 would produce an aerodynamic drag on the left wing producing a turn to the left. To stop the turn, the pedal 21 would be released and the spring 25 would force member 24 to the right causing arms 26, 27, 28, and 29 to incline, thus closing surfaces 3 and 4.

Conversely, depressing pedal 22 would turn the airplane to the right.

To increase the sinking speed of the airplane, the pilot would depress both pedal 21 and pedal 22. With both pedals depressed, a turn would be made by releasing pressure on the pedal on the side opposite to which the turn is made.

It would be safe to fly the airplane with the upper and lower surfaces of both control units spread as the low aerodynamic pressure between the upper and lower surfaces would cause air to flow from the upper surface of the wing through openings 31; thus preserving laminar flow over the upper surface of the wing and preventing the wing tips from stalling.

The inventor has described one form of cable operation which could be used to operate the control units in a manner which would accomplish the objects of the invention. It is understood that push-pull or torque tubes could be used to operate the system but the method described is simple and would operate satisfactorily.

The system described would be easy to manufacture and install. The tracks 17 and 18, on which the carriage 16 travels, would be secured to the upper part of the fuselage. An opening would be provided in the instrument panel of the airplane so that the shaft 30 could pass through it. The shaft 30 would pass through the bearing support 34 and the quadrants 19 and 20 would be pinned to it.

The particular installation described leaves the floor space immediately ahead of the pilot free of controls so that an emergency exit or bomb sight could be installed in that space.

I claim:

1. In a tailless airplane a fuselage, a wing surface at each side thereof, a movable control surface in each wing comprising a portion of the trailing edge of the wing and extending forwardly therefrom, means to simultaneously move said control surfaces upwardly or downwardly or to simultaneously move one of said control surfaces upwardly and the other downwardly or vice versa, a pair of superposed control surfaces at and extending forwardly of the trailing edge of each of said wings, each control surface of each of said pairs being movably mounted in respect of the other to permit the upper control surface to be moved upwardly and the lower control surface downwardly in respect to the wing, air passageways in the upper control surface of each of said pair of surfaces to permit airflow through said surfaces to preserve laminar flow over the upper surfaces of the wings when said upper surfaces are elevated, means to operate one of said pair of control surfaces independently of the other or to operate both of said pairs simultaneously, the parts operating whereby either independent or simultaneous directional, lateral and longitudinal control of said airplane is obtained and permitting the imposition of a drag upon the airplane to increase its sinking speed without causing either directional control or the stalling of the airplane wing tips.

2. In a tailless airplane, a fuselage, a wing surface at each side thereof, a movable control surface in each wing, said control surfaces being substantially T-shaped the head of said control surfaces constituting the tip for the ends of said wings, a portion of said control surface constituting a portion of the trailing edge of said wing, means to simultaneously move said control surfaces upwardly or downwardly to provide longitudinal control of the airplane or to simultaneously move one of said control surfaces upwardly and the other downwardly or vice versa to provide lateral control of the said airplane, a pair of superposed control surfaces in the trailing edge of each of said wings and disposed between the stem portion of said first named control surfaces and the trailing edges of the wings, each control surface of each of said pairs being movable in respect to the other whereby the upper control surface can be moved upwardly and the lower control surface downwardly and means to operate one of said pairs of control surfaces independently of the other or to operate both of said pairs of control surfaces simultaneously, the parts operating whereby either independent or simultaneous directional, lateral and longitudinal control of the airplane is provided.

3. A structure such as defined in claim 2 wherein the upper control surfaces of each of said pair of control surfaces is provided with passageways to permit the flow of air therethrough from the upper surface of the wings into the low pressure region created between the deflected upper and lower surfaces of said control devices to preserve laminar flow over said wing upper surfaces, for the purpose described.

4. In a tailless airplane, a fuselage, a wing surface at each side thereof, a movable control surface in each wing, said control surfaces being substantially T-shaped with the head of the T rounded, the rounded head portion of said control surfaces constituting a rounded tip for the ends of said wings with a portion of said surfaces constituting a portion of the trailing edges of said wings, means to simultaneously move said control surfaces upwardly or downwardly to provide longitudinal control of the airplane or to simultaneously move one of said control surfaces upwardly and the other downwardly or vice versa to provide lateral control of said airplane, a pair of superposed control surfaces in the trailing edge of each of said wings and disposed between the stem portion of said first named control surfaces and the trailing edges of the wings, each control surface of each of said pairs being movable in respect to the other whereby the upper control surface can be moved upwardly and the lower control surface downwardly and means to operate one of said pairs of control surfaces independently of the other or to operate both of said pairs of control surfaces simultaneously, the parts operating whereby either independent or simultaneous directional, lateral and longitudinal control of the airplane is provided.

5. In a tailless airplane, a fuselage, a wing surface at each side thereof, the tip and a portion of the trailing edge adjacent the tip of each wing being cut out, a control surface in each wing constituting the tip and a portion of the trailing edge thereof, a pair of superposed control surfaces forming a part of each wing and filling in the remaining cut out portions of said wings, the upper and lower control surfaces of each of said pair of control surfaces being movable in respect to one another, and means to move said control surfaces whereby either independent or simultaneous directional, lateral and longitudinal control of said airplane is provided.

6. A construction such as defined in claim 5 wherein the upper control surfaces of each of said pair of control surfaces is provided with passageways to permit the flow of air therethrough from the upper surface of the wings into the low pressure region created between the deflected upper and lower surfaces of said control device to preserve laminal flow over said wing upper surfaces, for the purpose described.

7. In a tailless airplane, a fuselage, a wing at each side thereof, a substantially horizontally disposed control surface forming a part of the trailing edge of each wing and movably secured at its forward edge to said wing for movement about a horizontal axis, a pair of superposed substantially horizontally disposed control surfaces forming a part of the trailing edge and a part of the upper and lower wing surfaces of each of said wings, the upper control surface of each of said pair of control surfaces provided adjacent its forward edge with air passageways, each of said surfaces at its forward edge secured to said wing for movement about a horizontal axis, and means operable by the pilot for swinging said control surfaces upon their axial supports to produce either independent or simultaneous directional, lateral and longitudinal movement of said airplane.

8. In a tailless airplane, a fuselage, a wing at each side thereof, a substantially horizontally disposed control surface forming a part of the trailing edge of each wing and movably secured at its forward edge to said wing for movement about a horizontal axis, a pair of superposed substantially horizontally disposed control surfaces forming a part of the trailing edge and a part of the upper and lower wing surfaces of each of said wings, said first named control surfaces having a portion disposed forward of and extending along the forward edges of the upper control surface of each of said pair of control surfaces, each of said surfaces at its forward edge secured to said wing for movement about a horizontal axis, and means operable by the pilot for swinging said control surfaces upon their axial supports to produce either independent or simultaneous directional, lateral and longitudinal movement of said airplane.

9. In a tailless airplane, a fuselage, a wing at each side thereof, a substantially horizontally disposed control surface forming a part of the trailing edge of each wing and movably secured at its forward edge to said wing for movement about a horizontal axis, a pair of superposed substantially horizontally disposed control surfaces forming a part of the trailing edge and a part of the upper and lower wing surfaces of each of said wings, said first named control surfaces having portions which constitute the tips of said wings, each of said surfaces at its forward edge secured to said wing for movement about a horizontal axis, and means operable by the pilot for swinging said control surfaces upon their axial supports to produce either independent or simultaneous directional, lateral and longitudinal movement of said airplane.

JOHN DONALD McKELLAR.